United States Patent [19]

Vitali

[11] Patent Number: 5,100,297

[45] Date of Patent: Mar. 31, 1992

[54] DRIVE ASSEMBLY FOR PRESSES FOR EXTRACTING COCOA BUTTER FROM A COCOA PASTE

[76] Inventor: Primo Vitali, Via Azzeccagarbugli, 5, 22063 Lecco, Como, Italy

[21] Appl. No.: 536,696

[22] Filed: Jun. 12, 1990

[30] Foreign Application Priority Data

Jun. 14, 1989 [IT] Italy ................. 20868 A/89

[51] Int. Cl.⁵ ......................................... F04B 41/06
[52] U.S. Cl. ................................ 417/2; 92/139; 417/45
[58] Field of Search ............ 417/2, 44, 360, 45, 417/418; 92/139, 165

[56] References Cited

U.S. PATENT DOCUMENTS

| | | | |
|---|---|---|---|
| 2,550,369 | 4/1951 | Moreillon | 92/139 X |
| 4,145,161 | 3/1979 | Skinner | 417/22 |
| 4,431,384 | 2/1984 | Walser | 417/360 |
| 4,566,370 | 1/1986 | Hanafi | 417/415 X |
| 4,729,249 | 3/1988 | Besic | 92/165 R X |
| 4,971,522 | 11/1990 | Butlin | 417/45 X |

*Primary Examiner*—Stephen M. Hepperle
*Attorney, Agent, or Firm*—Bucknam and Archer

[57] ABSTRACT

A drive assembly for presses for extracting cocoa butter from a cocoa paste comprises two three-piston pumps, of a constant flow-rate type, the motors of which are power supplied through corresponding frequency converters which are controlled by controlling systems programmed by electronic computers.

The pumps are so constructed and designed so as to facilitate conventional operations for replacing the gaskets of the pump pistons.

4 Claims, 3 Drawing Sheets

DRIVE ASSEMBLY FOR PRESSES FOR EXTRACTING COCOA BUTTER FROM A COCOA PASTE

BACKGROUND OF THE INVENTION

The present invention relates to a drive assembly for presses used for extracting cocoa butter from a cocoa paste.

As is known, cocoa butter is conventionally extracted from cocoa paste, to make chocholate and cosmetic and pharmaceutical products by using press filters which are driven by hydraulic pumps.

Also known is the fact that conventional drive assemblies used for the above mentioned application comprise a low-pressure pump, held in a housing, and a high pressure pump, having three low speed pistons which are driven by a flywheel, crank shaft and pistons.

More specifically the two pumps are started together, in a tandem relationship, and are controlled by a pressure gauge, including a suitable electrical contact adapted to cause the low pressure pump to be stopped at a given pressure, usually 300 bars, whereas the high pressure pump operates from 300 bars upward.

Then, a conventional valve driving means disengages a piston of the mentioned high pressure pump, as a pressure of 420 bars is reached, and another valve driving means disengages a second piston at 450 bars.

The third piston, on the other hand, continues to operate up to the end of the pressing cycle, that is up to a pressure of 500 bars, which usually corresponds to a pressing end pressure.

Then, the two pumps convey the cocoa oil to discharging cylinders, with a consequent decrease of the pressure in the extracting chambers, adapted to allow the cakes or cocoa panels to be discharged.

While the above disclosed operating cycle has been structurally improved, it has some drawbacks which are substantially due to the use of a low-pressure pump.

The latter usually consists of a conventional radial-piston pump the pistons of which pump with a variable pressure, the pressure variation being obtained by preset commands, for example from 3 to 5 commands.

To this pump there is conventionally applied a joint on the head portion of which there is mounted a small reducing unit to which there are sent 5 preset pulses indicative of corresponding speed revolutions and, accordingly, of corresponding pump flow rate values.

In this connection it should be pointed out that in this low pressure pump the hydraulic oil is never replaced and, accordingly, the expected life of this pump is of 2 or 3 years.

Moreover, as such a pump fails, it can not be immediately replaced since the user has not available in his store such a pump the type of which, moreover, is modified each 6 or 7 years by the manufacturers.

Thus, as such a pump fails, it must be fully replaced.

The high pressure pump, on the other hand, does not present the disclosed problems since it exclusively requires a periodic replacement of the piston seals.

This seal replacement operation, however, requires a previous disassembling of all of the piston rods and related piston guiding elements, which represents a comparatively complex operation.

SUMMARY OF THE INVENTION

Accordingly, the aim of the present invention is to overcome the above mentioned drawbacks, by providing a drive assembly for presses for extracting cocoa butter from a cocoa paste which is very simple construction wise and very reliable in operation.

Within the scope of the above mentioned aim, a main object of the present invention is to provide such a drive assembly for cocoa butter presses the operation of which can be advantageously controlled by a computer.

Another object of the present invention is to provide such a cocoa butter press driving assembly which requires a very reduced periodic maintenance.

According to one aspect of the present invention, the above mentioned aim and objects, as well as yet other objects, which will become more apparent hereinafter, are achieved by a drive assembly for presses for extracting cocoa butter from a cocoa paste, characterized in that said assembly comprises two three-piston pumps, of a constant flow rate type, said pumps being driven by corresponding electric motors power supplied by respective frequency converters adapted to be controlled by controlling units pre-programmed by electronic computers, said pumps being so designed and arranged as to facilitate replacement operations for replacing tightness seals of the pump pistons.

BRIEF DESCRIPTION OF THE DRAWINGS

Further characteristics and advantages of the drive assembly according to the present invention will become more apparent from the following disclosure of a preferred though not exclusive embodiment of the assembly which is illustrated, by way of an indicative but not limitative example, in the figures of the accompanying drawings, where.

Figure 1:
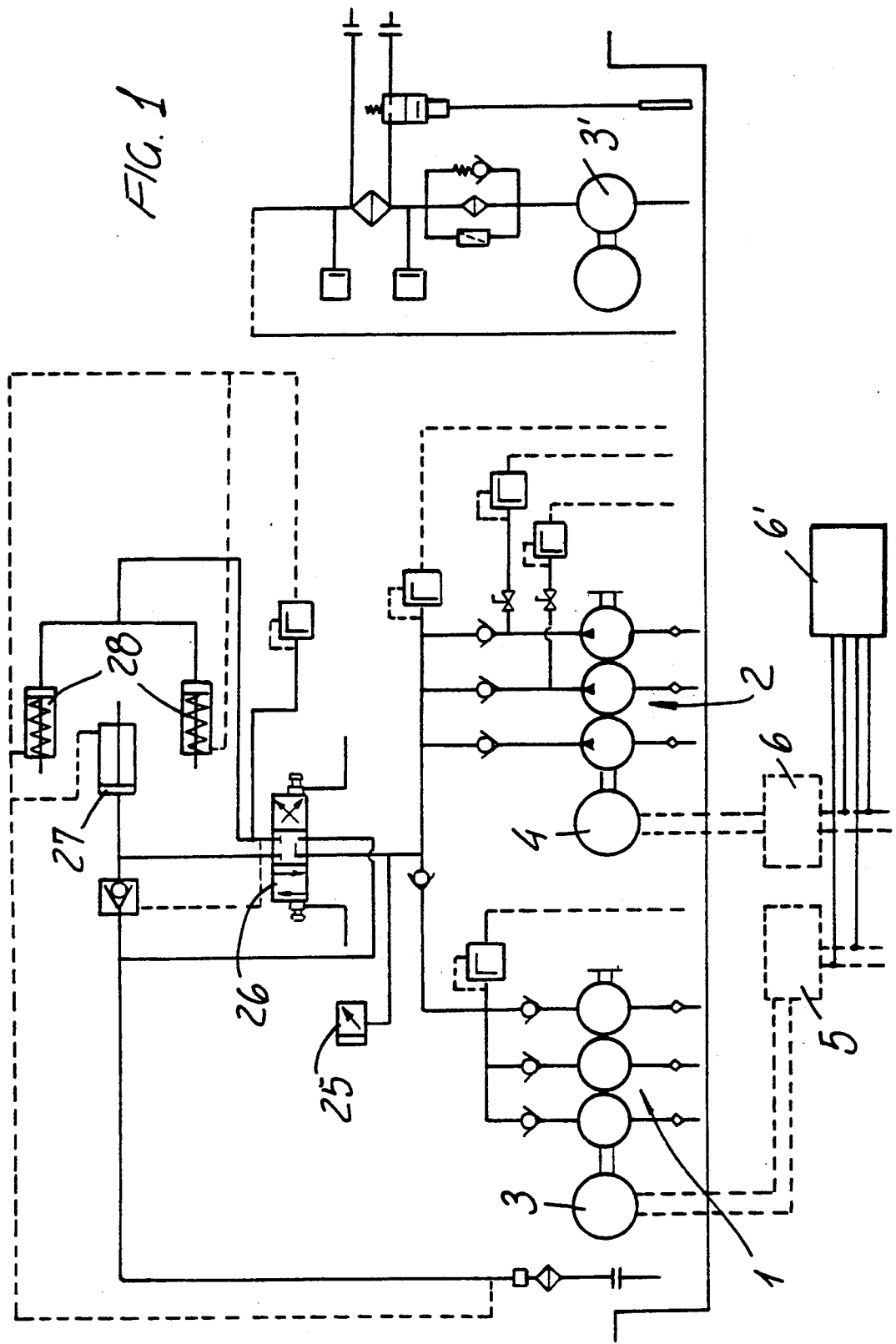
FIG. 1 shows an oleodynamic diagram of this drive assembly.
Figure 2:
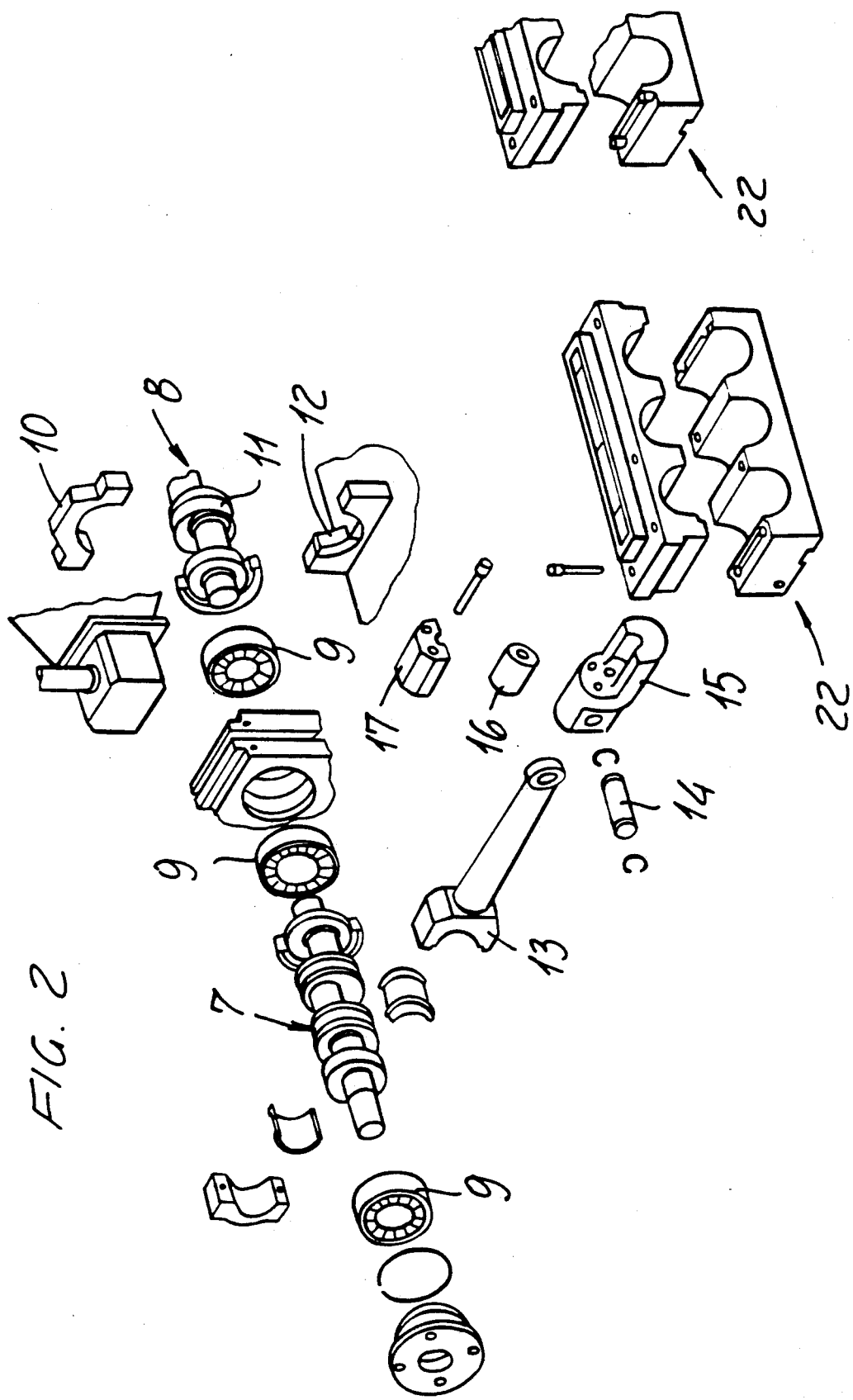
FIGS. 2 and 3 show exploded partial views of the two pumps included in the drive assembly according to the invention.
Figure 3:
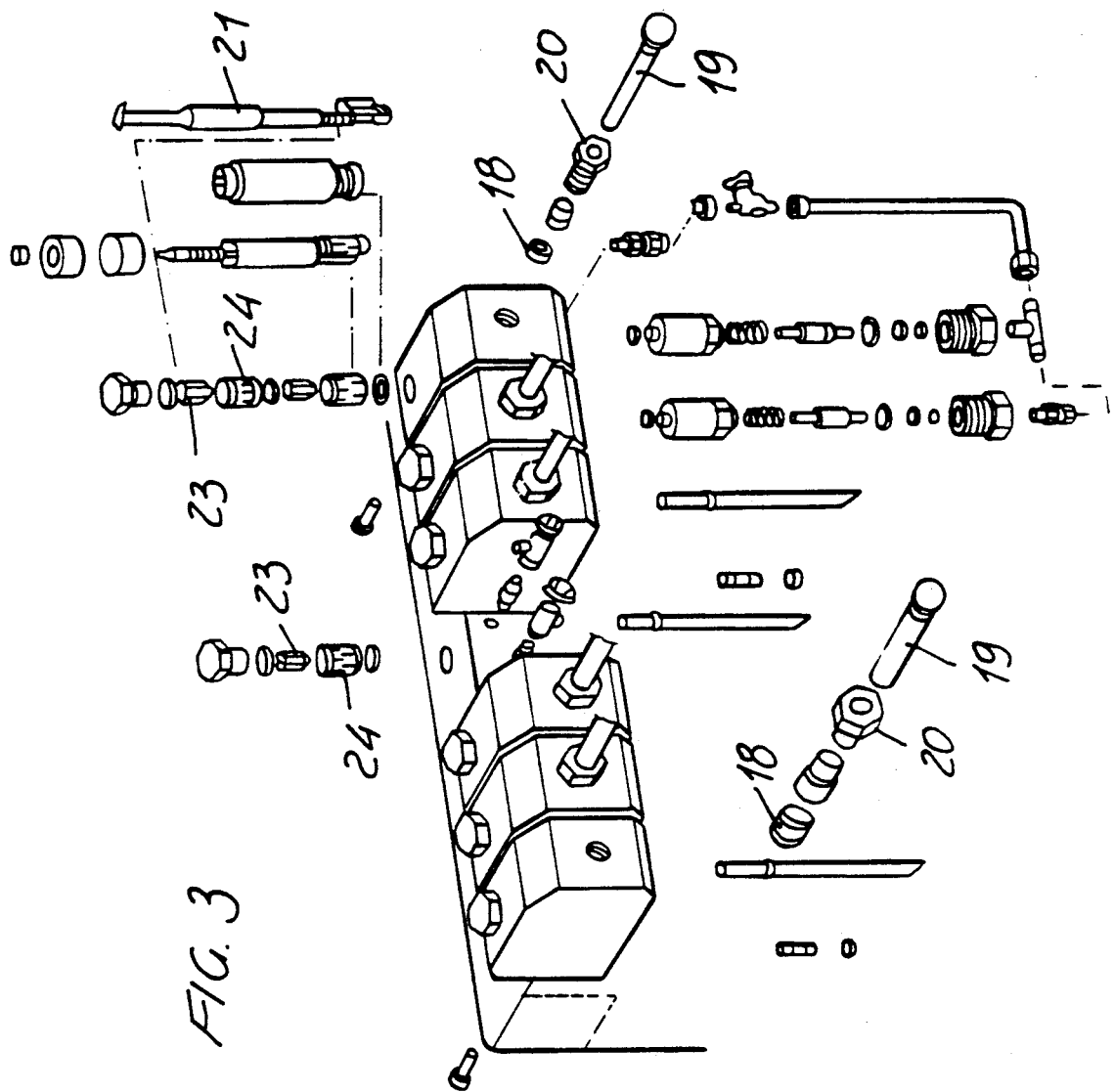

With reference to the figures of the accompanying drawings, the drive assembly for presses for extracting cocoa butter from a cocoa paste according to the invention comprises two pumps 1 and 2, each of which is of the free-piston constant flow rate type.

The electric motors 3 and 4 driving these pumps are controlled by frequency converters 5 and 6 which can be in turn controlled by means of pulse series supplied from several systems.

A first driving system, for example, can consist of controlling the two frequency converters by means of pressures preset on digital pressure gauges.

According to another possible approach, it can be provided that the central piston entrains a rack meshing with a sproket thereon there is mounted an encoder device having an infinite number of preset contacts.

By this second approach, in particular, the complete operating cycle of the pumps can be advantageously made automatic, under the control of a computer 6' controlling said frequency converters 5 and 6.

It should be moreover pointed out that the two crankshafts 7 and 8 of the pumps roll on bearings 9 and on bench supporting elements 10, 11 and 12 and that the piston rod 13 is coupled, by means of a coupling pin 14, to a piston guide 15 in which there is mounted a spacer element 16 and therewith a supporting element 17 cooperates.

In the disclosed construction, in order to replace a piston seal 18 of one of the pistons, the mentioned guide element 15 is brought to its end of stroke position, and the supporting element 17 is disassembled and the spacer element 16 removed.

Thus, the corresponding piston 19 of the pump will be displaced for the stroke distance of the spacer element so as to exit its housing.

Then, by loosing and removing the nuts 20, the seals to be replaced are exposed, and removed by using a suitable seal removing tool 21.

Accordingly, this seal replacement operation, which in conventional pumps was very complex, can be carried out in a very reduced time.

Moreover, the pump is arranged within a oil bath and all of the rotary parts thereof are lubricated with a suitable pressure provided by a small oil filtering pump 3.

More specifically, the latter pump (having preferably a flow rate of 50 l/min) is adapted to draw the contaminated oil, filter it and send it to the rotary parts up to the three support elements 22.

The pressure tightness, in particular, is assured by a plurality of small valves defined by the elements 23 and 24.

In this connection it should be apparent that the use of frequency converters allows the constant flow rate pumps to be easily controlled with respect to corresponding variable flow rate pumps.

Another fact to be pointed out in this connection is that high pressure pumps, such as 500 atm's variable flow rate pumps are not at present commercially available.

The 500 bars fixed flow rate pumps, on the other hand, have a very reduced life time, since the minimum rpm number thereof is of 1,400 rpm's.

By using the above mentioned converters, the pump will have a rpm number from a minimum of 80 rpm's to a maximum of 210 rpm's.

Thus, it can be easily deduced that, at 80 rpm's, the operation loads can be easily supported by the piston rod, crank, crankshaft system.

From the construction standpoint, the drive assembly according to the invention comprises two axial piston constant flow rate pumps, of which at least the low pressure pump which operates during the first cocoa butter extraction step is driven by an electric motor in turn controlled by a frequency converter adapted to suitably change the rpm number of the pump.

In particular, in a first operation step, that is the cocoa butter extracting initial step, the low pressure pump is driven at a suitable high speed.

Then, as the pressure increases, the speed of the electric motor driving the low pressure pump is decreased under the control of the computer.

The high pressure pump, in turn, is driven, from the start of the operating cycle, by another electric motor in turn controlled by a computer through a frequency converter.

Then, as a preset pressure is obtained, the low pressure pump is stopped, whereas the other pump continues to operate.

During the end extracting step, in particular, the motor driving the high pressure pump will tend to slow its rotary speed.

For completeness it should be pointed out that the oleodynamic circuit of the subject drive assembly further comprises a pressure gauge element having two electrical contacts 25 one of which is used for switching off the electric motor of the low pressure pump while the other is used for switching off the electric motor of the high pressure pump as a safety pressure value is exceeded.

In this oleodynamic circuit there is moreover provided a distributor 26, either of the manual or of the pneumatic type, adapted to convey the pressurized fluid to the main cylinder 27 or to discharging cylinders 28.

From the above disclosure and from the accompanying drawings it should be apparent that the invention fully achieves the intended aim and objects.

While the invention has been disclosed and illustrated with reference to a preferred embodiment thereof it should be apparent that the disclosed embodiment is susceptible to several modifications and variations all of which will come within the spirit and scope of the accompanying claims.

I claim:

1. A drive assembly for presses for extracting cocoa butter from a cocoa paste, comprising two constant flow-rate pumps each having three piston pumps, two electric motors for operating each a respective said pump, and each being supplied with a variable frequency supply current, frequency converter means electrically coupled to said electric motors for frequency controlling said variable frequency supply current therefor, computer controlling means circuitally coupled to and controlling said frequency converters so as to cause said pumps to operate within an operating r.p.m.'s range from 80 to 210 r.p.m.'s.

2. A drive assembly according to claim 1, wherein each said pump has a crank shaft rotatably supported on bearings and on bench support elements, each said pump having three pistons including each a piston rod coupled, by a respective coupling pin, to a piston guide therein there is mounted a spacer element and therewith supporting means cooperates.

3. A drive assembly according to claim 1, wherein said pumps are arranged in an oil bath, and including rotary parts lubricated by a pressurized fluid supplied by an oil filtering pump.

4. A drive assembly according to claim 1, further comprising an oleodynamic circuit including a pressure gauge provided for switching off the electric motors of said pumps as a safety pressure value is exceeded, said circuit further including distributor means adapted to convey said pressurized fluid to a main cylinder or to discharging cylinders.

* * * * *